(12) United States Patent
Jaffe et al.

(10) Patent No.: US 7,640,188 B2
(45) Date of Patent: Dec. 29, 2009

(54) METHOD OF MANIPULATING DATA ASSOCIATED WITH PRODUCTS THAT ARE OFFERED FOR SALE IN CONNECTION WITH ELECTRONIC COMMERCE VIA A COMPUTER NETWORK

(75) Inventors: Stephen E. Jaffe, Alpharella, GA (US); Dennis Haynes, Plano, TX (US); Perry R. May, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 1498 days.

(21) Appl. No.: 10/224,975

(22) Filed: Aug. 21, 2002

(65) Prior Publication Data

US 2003/0050855 A1 Mar. 13, 2003

Related U.S. Application Data

(60) Provisional application No. 60/314,228, filed on Aug. 22, 2001.

(51) Int. Cl.
*G06Q 30/00* (2006.01)
(52) U.S. Cl. .................. 705/26; 705/27; 705/1
(58) Field of Classification Search ............ 705/26, 705/27, 1
See application file for complete search history.

(56) References Cited

U.S. PATENT DOCUMENTS 6,167,383 A * 12/2000 Henson ................ 705/26
6,285,986 B1 * 9/2001 Andrews ................ 705/26
6,598,026 B1 * 7/2003 Ojha et al. ............ 705/26
2001/0054013 A1 * 12/2001 Song ...................... 705/26
2002/0123957 A1 * 9/2002 Notarius et al. ......... 705/37
2006/0100889 A1 * 5/2006 Gosko ..................... 705/1

OTHER PUBLICATIONS

<www.dell.com> dated Aug. 15, 2000, retrieved via <www.archive.org>.*

(Continued)

*Primary Examiner*—Jeffrey A. Smith
*Assistant Examiner*—Michael A. Misiaszek
(74) *Attorney, Agent, or Firm*—Saul Ewing LLP; John R. Pivnichny

(57) ABSTRACT

The present invention comprises a software based method and apparatus for organizing, presenting and manipulating packages and bundles in electronic retailing that greatly reduces the number of SKUs an electronic retailer needs to assign and track in order to sell packages and bundles. This is accomplished by defining the relationships of sellable objects to each other at the product level, rather than the item level. In accordance with the invention, a parent SKU number is assigned for each bundle or package that an e-tailer defines. A plurality of interrelated tables or databases are maintained in which the individual products that comprise bundles and packages are defined at the product level, rather than the item level. The definitions are recursive in that a product may simultaneously be for sale individually as well as part of one or more packages and/or bundles. When any product is manipulated (e.g., added or deleted from the shopping cart), the tables are consulted to determine if that product is part of a package or bundle and what other products comprise that bundle so that any such other products are manipulated accordingly.

24 Claims, 5 Drawing Sheets

PRODUCT TABLE

| prrfnbr | nrnbr | prpgtype | prbuyabl | Comments |
|---|---|---|---|---|
| Internally generated NC ref # | PCN Number | New field to indicate the type of bundle<br>P = package<br>B = bundle<br>Null = None | Product "Buyable" flag<br>0=No (component of a package)<br>1=Yes<br>2=Parent product for package or bundle. | |
| 123 | 012119 | P | 2 | New Parent |
| 410 | 012110 | P | 0 | Coat |
| 420 | 012121 | P | 0 | Portly Coat |
| 440 | 012132 | P | 0 | Pants |
| 600 | 012143 | B | 1 | Vest |
| 700 | 03234 | B | 1 | Tie |

OTHER PUBLICATIONS

<www.tigerdirect.com> dated Nov. 17, 2000, retrieved via <www.archive.org>.* http://www.blair.com, dated Mar. 3, 2000 and Aug. 15, 2000. Retrieved via archive.org on Apr. 4, 2007.*

David Hewson, "Package deals; Windows" Feb. 20, 1994, The Times, London. Retrieved via Proquest on Jun. 18, 2009.*

* cited by examiner

| women's | men's | home | kitchen | gifts | health | clearance |

Catalog Quick Find

Enter Product Number

For Example: X12345

Shop Men's
- Suits & Sportcoats
  On Sale
  Casual Shirts
  Dress Shirts
  Sweaters
  Pants
  Outerwear
  Activewear
  Shorts / Swimwear
  Lounge / Sleepwear
  Footwear
  Westernwear
  Accessories
  Formalwear
  Socks & Underwear

Keyword Search

Advanced Search

Coordinates Sale!
Savings to 60%

Footwear Clearance
Savings to 66%

Kitchen Closeout
Savings to 50%

Poly/Wool Gabardine Suits

Double and single-breasted gabardine suits are a blend of long-wearing polyester and rich worsted wool. Fully lined coats have back center vents; pants are double-pleated. Dry clean. Imported of fabric made in USA.
* Chest Sizes 50 thru 60 & all Portly Sizes Ties are imported of fine silk. Regular length 56"; Long length 62".
* Long Length Ties

MSTGF7C

Qty  Poly/Wool Gabardine Suits $129.95 - $144.95*

Shopping Tools

Colors/Styles
Sizes Offered

Poly/Wool Gabardine Suit Coat
Product X04215
| Style | Color | Size | Length |
| Single Breasted | Black | 37 | Short |

Poly/Wool Gabardine Suit Pants
Product X04217
| Color | Waist | Inseam |
| Black | 30 | 28 |

Regular & Long Silk Ties
Product# X12580            $14.95 - $17.95*
| Color | Length | Qty |
| Gold | Regular | |

[Add to My Basket]
(you can always remove it later)

| Shop With Confidence | Customer Service | Catalogs & Specials |
|---|---|---|
| Security & Privacy Policy | Help / Contact Us | Place Catalog Order |
| Our Return Policy | My Account | Request a Catalog |
| About Blair | Customer Survey | Email Specials |
|  | Shipping & Delivery |  |

Investor Information   VeriSign

Satisfaction Guaranteed.
ABSOLUTELY!
If any item ever fails to perform to your satisfaction, return it for a

PRODUCT TABLE

| prrfnbr<br>Internally generated NC ref # | nrnbr<br>PCN Number | prpgtype<br>New field to indicate the type of bundle<br>P =package<br>B =bundle<br>Null = None | prbuyabl<br>Product "Buyable" flag<br>0=No (component of a package)<br>1 = Yes<br>2=Parent product for package or bundle. | Comments |
|---|---|---|---|---|
| 123 | 012119 | P | 2 | New Parent |
| 410 | 012110 | P | 0 | Coat |
| 420 | 012121 | P | 0 | Portly Coat |
| 440 | 012132 | P | 0 | Pants |
| 600 | 012143 | B | 1 | Vest |
| 700 | 03234 | B | 1 | Tie |

OBJREL TABLE

| objprnt<br>NC product reference number prrfnbr for parent product of the bundle or package from product table | objchild<br>NC product reference number prrfnbr for the child product in the bundle or package from product table | objsqnbr<br>Sequence number for controlling display order within bundle type | objrltyp<br>Type of bundle<br>P =package<br>B =bundle | Comments |
|---|---|---|---|---|
| 123 | 410 | 1 | P | Coat |
| 123 | 420 |  | P | Portly Coat |
| 123 | 440 | 2 | P | Pants |
| 123 | 600 | 1 | B | Vest |
| 123 | 700 | 2 | B | Tie |

FIG 4

SHIPTO: Shipto Association

The table SHIPTO associates each product and item in a suborder with a shipping address. Each row corresponds to one product or item.

Note: Although this table is named SHIPTO it is actually used to hold the line items for the shopping cart and submitted order, and to track order status by line item.

STCMT field used for monogramming/personalization to store packed data consisting of M/P code, PCN and text.

Blair to define their own status codes to be stored in STSTAT.

| Column Name | Column Type | Column Description |
|---|---|---|
| STRFNBR | INTEGER NOT NULL | Unique shipto reference number, internally generated. This is a primary key. |
| STORNBR | INTEGER | Order reference number. This is a foreign key that references column ORRFNBR in table ORDERS. |
| STSANBR | INTEGER NOT NULL | Address reference number for the shipping address. |
| STSHNBR | INTEGER NOT NULL | Shopper reference number. This is a foreign key that references column SHRFNBR in table SHOPPER. |
| STMENBR | INTEGER NOT NULL | Merchant reference number. This is a foreign key that references column MERFNBR in table MERCHANT. |
| STPRNBR | INTEGER NOT NULL | Product reference number. This is not a foreign key.<br>Note that no foreign key is defined on column STPRNBR so that no information on ant order is list when the product in table PRODUCT is deleted. |
| STPRICE | NUM (15,2) | Unit price of the item. |
| STCPCUR | CHAR (10) | Currency in which the prive is expressed. The format of the currency must adhere to ISO4217 standards. |
| STPCODE | CHAR (5) | This is a foreign key (delete rule = set null) That references column TPCODE in table TAXPRCODE. |

FIG. 5A

| STQUANT | INTEGER NOT NULL | Quantity ordered. |
|---|---|---|
| STSTAT | CHAR (1) NOT NULL | Order Status:<br>P – Order in pending state<br>C – Order was submitted.<br>X – Order was cancelled<br>I – Inventory updated pending (order no longer pending)<br>M - Ready for authorization (order passed inventory update)<br>Note: All single upper case letters are reserved for Net.Commerce.<br><br>Note : The following lower case status codes have been defined for the Blair site:<br><br>b = back ordered.<br>s = shipped<br>i = in process<br>p = partially shipped |
| STPSTMP | TIMESTAMP (for DB2) DATE (for Oracle) | The date and time the shipto entry was made. |
| STUSTMP | TIMESTAMP (for DB2) DATE (for Oracle) | The date and time the shipto entry was last updated. |
| STSMNBR | INTEGER | Merchant shipping mode reference number (refer to MSHIPMODE). |
| STFIELD1 | INTEGER | Parent package's unique SHIPTO reference number.<br><br>This column is populated for each associated child product of the package.<br><br>This isused when a package is deleted from the cart, to indicate exactly which products are "tied" to the package. It is also used when the quantity of the package is changed, to update the associated child products. |
| STFIELD2 | VARCHAR (254) | Monogram flag:<br><br>Set to "M" if the product is the monogram itself. |
| STTRKNBR | CHAR (64) | Tracking number. |
| STTRKDATE | DATE | Shipment date. |
| STBASEPRICE | NUM (15, 2) | If the product price was converted, this is the original price before conversion. |
| STBASECURR | CHAR (3) | Original currency before conversion in alphabetic code as per ISO 4217. |

FIG. 5B

METHOD OF MANIPULATING DATA ASSOCIATED WITH PRODUCTS THAT ARE OFFERED FOR SALE IN CONNECTION WITH ELECTRONIC COMMERCE VIA A COMPUTER NETWORK

RELATED APPLICATION

This application claims priority to and incorporates by reference U.S. Provisional Application No. 60/314,228, filed Aug. 22, 2001.

FIELD OF THE INVENTION

The invention pertains to the implementation of electronic commerce Web sites. More particularly, the invention pertains to the organization and presentation of data pertaining to the sale of packages and bundles via electronic commerce, and particularly via the World Wide Web.

BACKGROUND OF THE INVENTION

The Internet is a vast collection of computing resources, interconnected as a network, from sites around the world. It is used every day by millions of individuals. The World Wide Web (referred to herein as the "Web") is that portion of the Internet that uses the HyperText Transfer Protocol ("HTTP") as a protocol for exchanging messages. (Alternatively, the "HTTPS" protocol can be used, where this protocol is a security-enhanced version of HTTP.)

A user of the Internet typically accesses and uses the Internet by establishing a network connection through the services of an Internet Service Provider (ISP). An ISP provides computer users the ability to dial a telephone number using their computer modem (or other connection facility, such as satellite transmission), thereby establishing a connection to a remote computer owned or managed by the ISP. This remote computer then makes services available to the user's computer. Typical services include: a search facility to search throughout the interconnected computers of the Internet for files of interest to the user; a browse capability for displaying information files located with the search facility; and an electronic mail facility, with which the user can send and receive mail messages from other computer users.

The HTTP communications protocol uses a request/response paradigm, where the electronic messages sent between communicating computers can be categorized as either requests for information or responses to those requests.

The user working in a Web environment will have software running on his or her computer to allow him or her to create and send requests for information onto the Internet, and to see the results. These functions are typically combined in a software package that is referred to as a "Web browser", or "browser". After the user has created a request using the browser, the request message is sent out into the Internet (typically, via an ISP, as described above). The target of the request message is one of the interconnected computers in the Internet network. That computer receives the message, attempts to find the data satisfying the user's request, formats that data for display with the user's browser, and returns the formatted response to the browser software running on the user's computer.

This is an example of a client-server model of computing, where the computer at which the user requests information is referred to as the client or client machine, and the computer that locates the information and returns it to the client is the server or server machine. In the Web environment, the server is referred to as a "Web server".

Content on the Internet is served in individual files in the form of HTML pages. HTML (HyperText Markup Language) is a computer programming language specifically designed for a distributed network such as the Internet. An HTML page contains HTML code, which indicates how the information content is to be displayed, as well as at least some of the actual content. Pages also typically contain references to other files where at least some of the content is contained. Web browser software is designed to issue requests for pages in the form of URLs (Universal Resource Locators). A URL essentially is an address of a file that is accessible through the Internet. The URL includes the name of the file that is being requested and the IP (Internet Protocol) address of the server on which it is to be found.

A user at a client machine may type a URL into an appropriate field in a GUI (Graphical User Interface) generated by the Web browser software in order to address Web pages. Another way of addressing Web pages is by hyperlinking. A hyperlink is a portion in one Web page, such as a portion of text or an image, that, when selected (such as by positioning a cursor over that portion and pressing a button on the cursor control device), automatically addresses another Web page. Thus, for example, by manipulating one's mouse to cause the screen cursor to move over a hyperlink and clicking, the page addressed by that hyperlink is accessed by the browser.

Each request is routed through the Internet to the server identified in the URL. That server then returns the requested page through the Internet to the client machine that requested it. The Web browser software reads the HTML code in the page and, if that page contains references to other files containing some of the content, the browser software sends further requests for those files. It displays the content (whether contained directly in the HTML page or in another file referenced within the HTML page) in a manner dictated by the HTML code in the page.

Countless commercial, educational, government and other institutions operate servers containing HTML pages that are accessible to client machines via the Internet. The term "Web site" generally refers to a collection of HTML pages that are maintained on (or generated on-the-fly by) one or more servers by or on behalf of a single entity and that are related to each other in some fashion.

As noted, one of the more common uses of the Internet is shopping. Large scale Web retailers operate Web sites that consumers can navigate through to find a particular product or products for purchase. As is well known in all forms of retailing, certain products tend to go with each other in the sense that they are often purchased together because they relate to one another or relate to the same purpose. For instance, someone who is purchasing a new men's suit may very well also be interested in purchasing related accessories, such as a tie or a shirt to go with the suit. Even if such person did not have a preexisting intent to purchase additional products, if a matching tie and shirt were presented to such person while in the process of purchasing the suit, there is a reasonable likelihood that such a person also may purchase the accessories.

For purposes of this discussion, there are two general types of relationships between multiple goods, typically termed packages and bundles, respectively. The suit and tie example above is a classic example of a bundle of goods. Bundles are characterized by products which are related to each other, but typically are not sold or priced together as a unit. Other examples of bundles include (1) golf clubs and a golf bag or (2) a volleyball net and a volleyball.

Packages, on the other hand, typically comprise more closely related products in that they are usually sold together for a single collective price. A classic example of a package is a men's suit, which comprises a jacket and a pair of pants. A suit usually is sold as a unit for a particular price and the jacket and pants cannot be purchased separately. However, the fact that something is a package does not necessarily preclude the possibility of also selling the individual products (i.e., the jacket and the pants) separately. For instance, it is not uncommon for a retailer to offer a second pair of identical pants for an extra charge, since pants tend to wear out much more quickly than jackets. However, separately purchasing the individual products that make up the package usually will have a higher cost than buying them as a package.

Further, it certainly is possible for the same group of products to be offered for sale as either a package or a bundle. For instance, skis, ski boots, bindings, and poles are often sold as a package with a special package price that is less than the total cost if the products are purchased separately. However, the very same ski's, ski boots, bindings and poles could be offered for sale individually and separately and, thus, the retailer, could also present them for sale as a bundle.

In essence, bundles or bundling of products is an attempt to cross-sell two or more related products. However, the term bundle, at least in the vernacular of the electronic commerce field, is typically used slightly more narrowly than cross-selling and typically is used to refer to products that are shown on a Web page in a single image, whereas cross-selling is usually used either as a generic term encompassing essentially any attempt to direct a consumer to an additional product or at least where the Web page displays separate individual images of the products.

The key distinction between a bundle and a package relevant to this disclosure essentially is that a package is a collectively priced set of goods that is treated as a single unit for record keeping and other purposes, whereas a bundle is two or more distinct goods that a retailer is attempting to cross sell with each other, but for which there is no special collective price.

Typically, a consumer navigates through the Web pages of a Web site until he or she finds a page on which the product of interest is located. A well designed Web site will also display related products on the same page. One common scheme or displaying goods for sale in electronic retailing is to present bundles of goods in a single image on the page and include text that introduces all of the bundled goods in an initial paragraph or sentence, which is followed by separate descriptions and pricing information for the products. In at least one common Web site design scheme, if a persons arrives at the product of interest by specific, progressive navigation through the pages of the Web site, the article of interest is not presented in a bundle presentation, but rather separately, as shown in FIG. 1, for instance. In this case, the article is a package, and particularly, a men's suit. However, if a person arrives at the product page as the result of a search using a search engine or a search function provided by the Web site operator, the product is displayed as part of a bundle, as shown in FIG. 2. FIG. 2, for instance, shows a Web page offering a men's suit bundled with a matching tie. In fact, an e-tailer may have two different images for a product, one where it is shown collectively with related products for presentation as part of a bundle and another where it is shown individually.

Packages, on the other hand, normally are always presented in one image and described collectively and priced as a unit, as shown in FIGS. 1 and 2. Further, a bundle may include a package, also as illustrated in FIGS. 1 and 2.

The use of shopping cart pages for transacting sales via the Internet is well known. When a consumer indicates a desire to purchase one or more products by, for instance, selecting a "Buy Now" button on the product display page, the "Buy Now" button hyperlinks to a shopping cart page, in which the products selected for purchase by the consumer are listed usually along with their price. Typically, it is not until the user clicks on another button in the shopping cart page, e.g., a "Check Out" button, that the tax and shipping charges and total cost are calculated.

In any event, when a product is added to a shopping cart page, the SKU (Stock Keeping Unit) number is added to a list that the retail Web site operator keeps for the transaction. SKU's are well known to all retailers, including electronic commerce retailers (e-tailers). They are identification codes (usually alpha-numeric) for purposes of record keeping. Retailers typically assign a different SKU to each different product they offer for sale. The SKU may or may not actually be displayed on the shopping cart page, but is essential to the retailer in terms of keeping track of all of the necessary information for completing and filling orders and for stock keeping and inventory purposes.

Many items such as clothing, come in many different sizes and colors. For instance, what may be presented as a single men's suit jacket on a Web page (or a paper catalog for that matter) actually may comprise scores of different size jackets, The same is true of a pair of suit pants. For instance, suit jackets come in different chest sizes that can range from about 37 inches to as much as 56 inches and different lengths/girths, such as short, regular, long, extra long, portly, and portly short. Suit pants come in different permutations of waist and inseam sizes that could range from about 30 inches to 48 inches for waist sizes and 28 inches to 36 inches for inseam lengths (in one or two inch increments). While suits made of different fabrics typically are presented as different products, it also is not uncommon for a retailer to treat the fabric selection as another option, like waist or inseam length. Accordingly, a "package" comprising a suit jacket and a pair of suit pants to form a men's suit actually can present a very large number of permutations of jacket and pants. Thus, the number of possible permutations of actual pant and jacket combinations for a single suit "package" for purposes of stock keeping typically can run into the millions. Of course, many of the possible permutations of combinations of pants and jackets are improbable. For instance, it is highly unlikely that anyone would require a suit comprising an extra long jacket with a chest size of 37 inches and pants with an inseam of 30 inches and waist of 48 inches. Therefore, the retailer may choose not to offer such a combination. However, even discounting highly improbable jacket and pant combinations, the number of permutations can be quite large.

A specific product for which all variables (e.g. waist, inseam, and fabric) have been assigned is herein termed an item.

Prior art electronic commerce systems have utilized schemes in which a different SKU number is necessary for each possible combination of pants and jacket that can be sold as a package.

At least one reason why SKUs were assigned for each different combination of items comprising a package in the prior art is because the individual items (which may each have a SKU number of its own) comprising a package needed to be related to each other in some logical fashion so that they could be treated as a unit for some purposes. Let us consider as one example, a situation in which an individual places an electronic order for a particular mens suit having a certain jacket size and a certain pants size and for which the jacket size is found to be unavailable. Not only the jacket, but also the corresponding pair of pants that forms part of the package must be deleted from the order. The use of a unique SKU for that jacket and pants combination as well as a separate unique SKU for that particular size pants and another, separate SKU for that particular size jacket allows the relevant software to treat the jacket and pants as a unit when necessary or as separate entities, when necessary. Bundles often are treated the same way as packages. Particularly, each bundle of goods is assigned its own SKU number.

Accordingly, if an electronic commerce retailer, for instance, wants to bundle a tie, socks and shirt with a suit, the number of SKUs that the retailer must assign and maintain in its databases can be astronomical and extremely difficult to manage. Specifically, as the number of SKUs increases, the databases that the e-tailer must maintain become bloated, thus slowing down the response times of the database servers and/or requiring more powerful and thus more expensive servers to maintain acceptable response times.

Accordingly, it is an object of the present invention to provide an improved software based method and apparatus for selling packaged and bundled items via electronic commerce.

It is a further object of the present invention to provide an improved method and apparatus for transacting electronic commerce.

It is another object of the present invention to provide a software based method and apparatus for record keeping with respect to packaged and bundled items in which the relationships between objects are defined at the product level, rather than the item level.

SUMMARY OF THE INVENTION

The present invention comprises a software based method and apparatus that greatly reduces the number of SKUs an e-retailer needs to assign and track in order to sell packages and bundles. This is accomplished by defining the relationships of objects to each other at the product level, rather than the item level. In accordance with the invention, a parent SKU number is assigned for each bundle or package that an e-tailer defines. A plurality of interrelated tables or databases are maintained in which the products that comprise bundles and packages are defined at the product level, rather than the item level. The definitions are recursive in that a product may simultaneously be for sale individually as well as part of one or more packages and/or bundles. When any product is manipulated (e.g., added or deleted from the shopping cart), the tables can be consulted to determine if that product is part of a package or bundle and what other products comprise that bundle so that any such other products are manipulated accordingly. For instance, if a shopper attempts to remove a suit jacket from the shopping cart, the corresponding suit pants that comprise the men's suit package also is removed automatically.

Thus, in accordance with the invention, the objects that form the components of packages and bundles are defined in one or more tables at the product level, rather than the item level. This provides the ability to easily determine the relationships of products so that manipulations of products that form part of a package or bundle can be correlated to the other products in the package or bundle and those products can be manipulated correspondingly, if necessary, while saving millions of lines in the pertinent databases relative to systems in which object relationships are defined at the item level.

BRIEF DESCRIPTION OF THE DRAWINGS

FIG. 2 shows an exemplary Web page forming part of a retail Web site in which a main product and an accessory product are displayed for cross-selling purposes in a bundled presentation for cross-selling purposes.

FIG. 3 is a table showing the organization of a Product table in accordance with one particular embodiment of the present invention.

FIG. 4 is a table showing the organization of an Object Relationship (OBJREL) table in accordance with one particular embodiment of the present invention.

FIGS. 5A and 5B comprise a table showing the organization of a Ship To table in accordance with one particular embodiment of the present invention.

DETAILED DESCRIPTION OF THE INVENTION

Figure 1:
FIG. 1 shows an exemplary Web page forming part of a retail Web site in which a product is displayed in the absence of any special efforts to cross sell other products with the displayed products.

As is well known in the art of Web site development, most large-scale retail Web sites generate Web pages on the fly as relevant requests are received, rather than storing preset, static Web pages on a server. Particularly, various databases are maintained containing product and other information from which Web pages can be created and software retrieves data from those tables based on certain criteria contained in a request and builds a Web page with that material and serves it to the requesting client machine.

The present invention concerns the manipulation of data pertaining to products that are part of a package or bundle. This can include the on-the-fly creation of Web pages featuring packages and bundles as well as manipulations relating to the movement of data into and out of the shopping cart page.

The present invention can be implemented in any number of ways. The present invention is enabled largely by designing appropriate tables/databases that collectively disclose the information necessary to relate products to each other at the product rather than item level and software for (1) consulting those tables to retrieve the information necessary to build appropriate display files (e.g., Web pages) on the fly, (2) determining which products form parts of packages and bundles and when, and (3) manipulating the products that form parts of packages and bundles relative to each other depending on whether they have been presented to the requestor as a package, a bundle or neither. The following description is of one particular embodiment of the invention. It should be understood by those persons of skill in the related arts that the particular tables, fields in the tables, names of the tables and software steps are merely exemplary of the invention and are not limiting.

While a typical large scale Web site operator will maintain many tables and/or databases to effectively provide a user friendly and efficient Web site, in the embodiment of the invention described herein, there are three tables/databases that are particularly pertinent to manipulations of data pertaining to packages and bundles. They are the Product table, the Object Relationship (OBJREL) table and the Ship To table. The Product table is a table or database in which a unique identification code (a SKU) is assigned for every individual object that the Web site offers for sale as well as for every package and every bundle. The OBJREL table contains a line item for every package and every bundle and discloses the products (at the product level) that comprise each such package or bundle. The Ship To table essentially corresponds to the shopping cart. A Ship To table is created for each shopper when that shopper selects products for purchase and discloses the particular products at the item level (e.g., including all variables such as color and size) selected for purchase by the shopper. Each of these tables is described in more detail below.

A portion of an exemplary Product table is shown in FIG. 3. The Product table has an entry for each individual product (at the product level), package and bundle that the Web site operator chooses to sell. In order not to obfuscate the invention and to keep the discussion simple, FIG. 3 shown only a small number of exemplary entries in the various tables relating to products, packages and bundles centered around a particular men's suit, the Irvine Park suit. The products include a suit coat, a corresponding portly suit coat, the corresponding pair of suit pants, a matching suit vest, and a matching tie. The suit pants can be offered for sale along with the suit jacket or the portly suit jacket as a package. Further, that package can be offered for sale as part of a bundle that further includes the matching vest and tie. It will be understood by those of skill in the related arts that, typically, the Product table would comprise thousands of additional entries corresponding to thousands of additional products as well as many more packages and bundles.

For each entry (i.e., row in FIG. 3), the table includes a product reference number field (prrfnbr). The data in this field essentially is a SKU for the entry.

Accordingly, packages and bundles as well as the actual products are assigned unique SKUs. The entries corresponding to packages and bundles (hereinafter, collectively, Parent Products) essentially are place-holders for a collection of two or more products already listed elsewhere in the Product Table.

Each entry further includes a Product Package Type field (prpgtype) that indicates whether the entry is part of a bundle, part of a package or neither. The definitions set forth in this field are recursive or non-exclusive. That is, if a product is part of a package, it does not preclude the possibility that the product could also be sold separately. Further, a package or individual product can be part of a bundle. In fact, a package or product can be part of a bundle sometimes and not part of a bundle at other times. For instance, as described above in the Background section, a product or package may be presented as part of a bundle or not as part of a bundle depending on how the requestor navigated to the product or package.

The Product Table also includes a Product Buyable condition (prbuyabl) field that helps define whether an entry that is part of a package or bundle can be purchased separately. Specifically, the Product Buyable field indicates whether the product can be purchased individually, is solely part of a package, or is the Parent Product of a package.

It also should be understood that each entry in the Product table might comprise additional fields such as the address of an image showing the product or package individually, the address of another image showing the product/package along with other bundled products, pricing information, a text description of the suit, a list of all variable attributes (e.g., waist size, inseam length), a list of the possible values for each attribute, etc. As a further example, note that the table of FIG. 3 includes another field entitled product number (prnbr) that is a second unique identification code that may be necessary to cross correlate data with a second data system that may use a different product numbering scheme for one reason or another. Of course, such additional information alternately or additionally might be maintained in separate tables/databases.

A separate Object Relationship (OBJREL) Table discloses the products that comprises each Parent Product from the Product table, i.e., each package and bundle. FIG. 4 shows an exemplary OBJREL table. In this particular embodiment, the OBJREL table includes an entry for every product that is part of a package or a bundle. Any given product may be part of more than one package and/or bundle. A product appears in the OBJREL table as many times as it is part of a package or bundle. A product that is part of a package wherein that package is part of a bundle only appears once in the OBJREL table per package/bundle pair. Each entry in the OBJREL table includes an Object Parent number (objprnt) field containing the Parent product's SKU. Each entry further has a object child field (objchild) containing the SKU of the product. Another field for each entry is the Object Sequence Number field (objsqnbr). This is a numerical ordering of all of the products in each bundle and package. The sequence number will be used to determine the order in which the products comprising a package or bundle will be presented in the display of the page. As previously noted, products that comprise a package or bundle typically will be shown in a single image and thus sequence is not an issue with respect to images. On the other hand, additional information, such as pricing information and selection drop down menus for size, color and other attribute usually also should appear on the page and must be organized in some sequence. If a package includes alternate products that form one part of a package, such as the suit jacket and the portly suit jacket, in the exemplary Web site discussed herein, then only one of the alternate products is assigned a sequence number.

The OBJREL table further includes an object relationship type (objrltyp) field for each entry. This field indicates whether the product (as identified in the objchild field) is part of a package or a bundle with the Parent Product (as identified in the objprnt field).

If a product is part of a package, but is not a Parent Product, then it will be treated as a unit along with the other product(s) that are part of that package in connection with any data manipulation of any product that is part of that package. If a product is part of a bundle only, but is not a Parent Product, then it will be treated individually in connection with any data manipulations. Of course, if a product is neither part of a package or a bundle, then it also will be treated individually in connection with any data manipulations.

The following description illustrates operation in accordance with one preferred embodiment of the present invention in connection with a bundle of products comprising one package (a men's suit) and one individual product (a tie). This condition presents one of the most complex scenarios in terms of processing in accordance with the present invention because both a package and a bundle are involved as well as an individual product. In addition, the individual products that form the package (i.e., the jacket, the pants and the vest) are all available in multiple sizes, each different size having its own SKU.

In one preferred embodiment of the invention, SKUs are assigned in connection with products that comprise multiple items, e.g., a suit jacket that is available in various sizes, such that all of the items comprising the product have the same root portion of a SKU plus an extension portion that uniquely identifies one of the items. For instance, using an example from the Product table of FIG. 3, the product having product reference number (or SKU) 440 is a pair of suit pants. They are available in a wide variety of permutations of waist and inseam lengths. Each available size has a unique SKU having the same root portion, namely 440, followed by a unique extension. In one embodiment, the extension may be a four digit number directly indicating the waist and inseam lengths. Thus, for instance, SKU 4403632 is the SKU for a pair of pants for the Irvine Park poly/wool suit having a waist size of 36 inches and an inseam length of 32 inches.

At the start, the system receives a request to build and serve a Web page corresponding to SKU 123, which is the SKU of the package representing the Irvine Park model men's suit (see the Product table of FIG. 3). This package comprises a regular or portly suit jacket (SKU 410 or 420) and a pair of suit pants (SKU 440). The request may be generated in any reasonable way. The manner in which the system generates this request is not the subject of the present invention, but it generally will be generated in response to a request from a client machine indicating that the shopper wishes to view the Irvine Park suit. In one typical example, the shopper might generate the relevant request by clicking on a hyperlink corresponding to the Irvine Park suit from a page displaying a selection of multiple suits, including that particular suit. In a Web site that chooses to allow the suit to be displayed to the requester either separately or as part of a bundle, the request will contain information indicating in which manner the suit is to be displayed. For sake of simplicity, let us assume that no such option is available and that the Web site always generates a Web page in which the suit is bundled with the matching vest and tie. The system consults the Product table and determines from the prpgtype field that SKU 123 is a package and determines from the prbuyabl field that it is the Parent Product of that package.

The system then performs a select from the OBJREL table for all entries with an objprnt (object parent)=123. The system then correlates the objchild field of the selected entries to the prrfnbr field in the Product table to create a list of all of the products for which the Irvine Park suit is the Parent Product. The system than pulls out of the Product table and/or any other pertinent tables the information that is needed to build the appropriate Web page. Such information might include, the address of the image showing the suit as part of a bundle, a textual description for the bundle, the SKU of the package, a short description of the package and price(s).

The system may have a particular Web page template that is to be used for displaying suits. Accordingly, it starts inserting the retrieved data into the appropriate portions of the template.

The system then consults the above-mentioned list that was created in response to the client request and locates the first child object in accordance with a predetermined hierarchy. For instance, in the present embodiment, the hierarchy is to first look for products that are part of a package corresponding to SKU 123 (i.e., objrltyp field=P) and take them in numerical sequence as dictated in the objsqnbr field in the OBJREL table followed by products that are part of a bundle corresponding to SKU 123 (i.e., objrltyp field=B) and take them in numerical sequence as dictated in the objsqnbr field in the OBJREL table.

The system inserts the data into the template in the dictated order to build a complete Web page for display to the shopper in response to the request. For instance, the template may have a field for the SKU, textual description and attributes for each product in the bundle. The SKU and textual description would normally simply be inserted into the appropriate field of the template. The variable attributes normally would be inserted in the form of a textual name of the attribute, e.g., "waist:" and a pop up menu or the from which the shopper can select a value for the attribute from the available attribute values.

Thus, for instance, the system will determine that the jacket 410 is the first product to appear on the page since it is part of package 123 and has the lowest sequence number (objrltyp=P. and objsqnbr=1). Hence, it will insert the SKU, textual description and attributes for jacket 410 in the appropriate fields of the template. The process will be repeated for the product in the list for which objrltyp=P and objsqnbr=2 and higher numbers, if any, and proceed onto the product in the list for which objrltyp=B and objsqnbr=1, if any, and then objrltyp=B and objsqnbr=2 and so on until there are no further products in the list. Any products in the created list with a null value in the objsqnbr field (e.g., the portly jacket) is ignored for purposes of building the Web page. This allows the suppression of multiple varieties of the same basic product that have different SKUs. These difference should be translated into an attribute (e.g., "style" or "size") and be treated like any other attribute such as waist size or inseam length.

The Web page is fully constructed at this point and can be served back to the requesting client. When the client/shopper selects a product for purchase, such as by clicking on a BUY NOW button displayed next to the displayed price of that product, the product is resolved to the item level by converting the selected attribute value(s) into a corresponding item level SKU and adding the product(s) to the Ship To table, i.e., to the shopping cart. The system will treat any manipulation (e.g., addition to the shopping cart, removal from the shopping cart, changing the quantity number in the shopping cart) of a item that is part of a package as an operation on all items in that package. Thus, for instance, if a shopper selects the attributes of a pair of Irvine Park suit pants and attempts to add the pants to the shopping cart, but has failed to select all applicable attributes of an Irvine Park suit jacket, the shopper will be presented with an error message indicating that the attributes of the jacket also must be specified. Further, if one of the pants and jacket are removed from the shopping cart, the other also will be removed. The Web site operator can choose to have bundled items treated in any number of ways. For instance, bundles may be treated exactly like packages in that, when one product in a bundle is manipulated, the other products forming the bundle are automatically manipulated in the same manner. However, in a simple embodiment, after the Web page corresponding to a bundle has been built and served, products and items that are related only through bundling can be manipulated individually without limitation.

FIGS. 5A and 5B show a table definition of the Ship To table. The table definition discloses the various fields that may be populated with data for each entry in the table. Each entry corresponds to an item in the shopper's shopping cart. The field definitions are largely self explanatory. The most pertinent field is the sffield1 field. Each item/entry that is part of a package has this field populated with the SKU of the Parent Product. When an item is manipulated (e.g., deleted from the shopping cart or its quantity is changed) that has this field populated, the system knows to determine if there are any other items in the Ship To table that have the same number in this field and to manipulate them in the same manner. As noted above, bundles and packages may be treated the same way in this regard. Alternately, this type of operation may be applied only if the Parent Product is a package type Parent Product (which may be determined, for instance, by consulting the OBJREL table).

Appendix A hereto is a design document containing further disclosure of a particular embodiment of the present invention.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

We claim:

1. A method of manipulating data associated with products that are offered for sale in connection with electronic commerce via a computer network, in which one or more of said products may be presented for sale (a) as an individual product, (b) as part of a package comprising multiple products, and/or (c) as part of a bundle comprising multiple products, said method comprising the steps of:
   (1) assigning a unique identification code to each product, package and bundle in at least one database;
   (2) with respect to each product, package and bundle, storing data in said at least one database indicating whether it is (a) part of a package, (b) part of a bundle, or (c) neither;
   (3) with respect to each unique identification code, storing data in said at least one database indicating that said identification code corresponds to one of (a) a product that can be purchased individually, (b) a package or a bundle, or (c) neither of the above;
   (4) for each product that is part of a package or bundle, storing data in said at least one database indicating every package or bundle to which it belongs;
   (5) responsive to a request received at a computer via said computer network for data about a particular product, said computer determining from said stored data whether said particular product is part of a package or a bundle;
   (6) if said particular product is part of a package or bundle, said computer determining from said stored data all other products that comprise said package or bundle;
   (7) if said particular product is part of a package or bundle, said computer building a display file comprising information about all of said products comprising said package or bundle; and
   (8) responsive to manipulation of a product that comprises part of a package, said computer effecting said manipulation on all other products comprising said package.

2. A method of manipulating data associated with products that are offered for sale in connection with electronic commerce via a computer network, in which one or more of said products may be presented for sale (a) as an individual product, (b) as part of a package comprising multiple products, and/or (c) as part of a bundle comprising multiple products, said method comprising the steps of:
   (1) assigning a unique identification code to each product, package and bundle in at least one database;
   (2) with respect to each product, package and bundle, storing data in said at least one database indicating whether it is (a) part of a package, (b) part of a bundle, or (c) neither;
   (3) with respect to each unique identification code, storing data in said at least one database indicating that said identification code corresponds to one of (a) a product that can be purchased individually, (b) a package or a bundle, or (c) neither of the above;
   (4) for each product that is part of a package or bundle, storing data in said at least one database indicating every package or bundle to which it belongs;
   (5) responsive to a request received at a computer via said computer network for data about a particular product, said computer determining from said stored data whether said particular product is part of a package or a bundle;
   (6) if said particular product is part of a package or bundle, said computer determining from said stored data all other products that comprise said package or bundle;
   (7) if said particular product is part of a package or bundle, said computer building a display file comprising information about all of said products comprising said package or bundle;
   (8) responsive to manipulation of a product that comprises part of a package, said computer effecting said manipulation on all other products comprising said package; and
   (9) for products comprising part of a package or bundle, storing in said at least one database a sequence number indicating a hierarchical position of said product in said package or bundle; and
   wherein step (7) comprises generating said display based on a hierarchical ordering of said products comprising said package or bundle.

3. The method of claim 2 wherein at least one product is part of more than one package or bundle and wherein step (4) comprises storing said data in a table comprising a separate entry for a given product for each separate package or bundle to which it belongs.

4. The method of claim 3 wherein steps (1), (2), and (3) comprise generating a first table comprising an entry for each product, package and bundle, each entry comprising a first data field containing said identification code, a second data field containing said data indicating whether it is (a) part of a package, (b) part of a bundle, or (c) neither, and a third data field containing said data indicating that it is one of (a) a product that can be purchased individually, (b) a package or a bundle, or (c) neither of the above.

5. The method of claim 4 wherein steps (4) and (9) comprise generating a second table comprising an entry for each product that is part of a package or bundle, each entry comprising a first data field containing said identification code, a second data field comprising the identification code of the package or bundle to which it belongs, and a third data field containing said sequence number indicating said hierarchical position of said product in said package or bundle.

6. The method of claim 5 wherein steps (4) and (9) comprise generating a second table comprising an entry for each product that is part of a package or bundle, each entry comprising a first field containing said identification code, a second field comprising the identification code of the package or bundle to which it belongs, and a third field containing said sequence number indicating said hierarchical position of said product in said package or bundle.

7. The method of claim 6 further comprising the step of:
   (10) further storing in said second table a fourth data field for each product containing data indicating whether said product is part of a package or part of a bundle.

8. The method of claim 7 wherein at east two of said products are alternates for each other within a package or bundle, and wherein step (7) comprises said computer generating said display using only one of said two alternate products.

9. The method of claim 8 wherein step (9) comprises storing in said third data field of said second table a sequence number for only one of said two alternate products and wherein step (7) comprises said computer generating said display using the one of said two alternate products for which a sequence number is found in said third data field of said second table.

10. The method of claim 1 wherein step (8) comprises responsive to manipulation of a product that comprises part of a bundle, said computer effecting said manipulation on all other products comprising said bundle.

11. The method of claim 1 wherein at least one product is part of more than one package or bundle and wherein step (4) comprises storing said data in a table comprising a separate entry for a given product for each separate package or bundle to which it belongs.

12. The method of claim 11 wherein steps (1), (2), and (3) comprise generating a first table comprising an entry for each product, each entry comprising a first data field containing said identification code, a second data field containing said data indicating whether it is (a) part of a package, (b) part of a bundle, or (c) neither, and a third data field containing said data indicating that said product is one of (a) a product that can be purchased individually, (b) a package or a bundle, or (c) neither of the above.

13. The method of claim 12 wherein step (4) comprises generating a second table comprising an entry for each product that is part of a package or bundle, each entry comprising a first data field containing said identification code, and a second field comprising the identification code of the package or bundle to which it belongs.

14. The method of claim 13 further comprising the step of:
(10) further storing in said second table a fourth data field containing data indicating whether said product of said entry is part of a package or part of a bundle.

15. The method of claim 1 wherein said manipulation comprises said computer performing data operations pertaining to the purchase of products.

16. The method of claim 15 wherein said manipulation comprises said computer inserting and removing said products from a purchase list.

17. The method of claim 1 wherein said network is the World Wide Web.

18. The method of claim 17 wherein said display file is a Web page.

19. The method of claim 1 wherein at least one of said products comprises a plurality of different items having different attributes.

20. The method of claim 19 wherein said attributes include one or more of size and color.

21. The method of claim 1 wherein a package is a plurality of products that are priced as a unit and a bundle is a plurality of products and/or packages that are related to each other but are not priced as a unit.

22. The method of claim 1 wherein at least one of said products can be purchased both individually and as part of a package.

23. The method of claim 1 wherein at least one package comprises part of a bundle.

24. The method of claim 23 wherein a product that is part of a package and said package is part of a bundle only appears once in said second table per package/bundle pair.

* * * * *